United States Patent
Anderson et al.

(10) Patent No.: US 6,931,410 B2
(45) Date of Patent: Aug. 16, 2005

(54) METHOD, APPARATUS, AND PROGRAM FOR SEPARATE REPRESENTATIONS OF FILE SYSTEM LOCATIONS FROM REFERRING FILE SYSTEMS

(75) Inventors: Owen T. Anderson, Chapel Hill, NC (US); Craig F. Everhart, Pittsburgh, PA (US); Boaz Shmueli, Pittsburgh, PA (US)

(73) Assignee: International Business Machines Corporation, Armonk, NY (US)

(*) Notice: Subject to any disclaimer, the term of this patent is extended or adjusted under 35 U.S.C. 154(b) by 462 days.

(21) Appl. No.: 10/044,730

(22) Filed: Jan. 11, 2002

(65) Prior Publication Data
US 2003/0135511 A1 Jul. 17, 2003

(51) Int. Cl.$^7$ ............................................ G06F 7/00
(52) U.S. Cl. ............................ 707/100; 707/1; 707/3; 707/102; 711/154
(58) Field of Search ....................... 707/1–10, 100, 707/102, 101, 104.1, 103, 200, 205; 711/154

(56) References Cited

U.S. PATENT DOCUMENTS

| | | | | |
|---|---|---|---|---|
| 5,187,786 A | | 2/1993 | Densmore et al. | 395/600 |
| 5,317,728 A | | 5/1994 | Tevis et al. | 395/600 |
| 5,463,772 A | * | 10/1995 | Thompson et al. | 707/101 |
| 5,566,331 A | * | 10/1996 | Irwin et al. | 707/10 |
| 5,627,996 A | * | 5/1997 | Bauer | 707/1 |
| 5,687,372 A | | 11/1997 | Hotea et al. | 395/675 |
| 5,742,817 A | * | 4/1998 | Pinkoski | 707/100 |
| 5,819,275 A | | 10/1998 | Badger et al. | 707/100 |
| 5,848,410 A | * | 12/1998 | Walls et al. | 707/102 |
| 5,870,734 A | * | 2/1999 | Kao | 707/200 |
| 5,915,129 A | * | 6/1999 | Slivka et al. | 711/154 |
| 5,937,406 A | * | 8/1999 | Balabine et al. | 707/102 |
| 5,946,685 A | * | 8/1999 | Cramer et al. | 707/200 |
| 6,023,710 A | * | 2/2000 | Steiner et al. | 707/204 |
| 6,026,402 A | * | 2/2000 | Vossen et al. | 707/10 |
| 6,055,527 A | | 4/2000 | Badger et al. | 707/2 |
| 6,098,072 A | | 8/2000 | Sluiman et al. | 707/103 |
| 6,594,663 B2 | * | 7/2003 | Schaefer et al. | 707/10 |
| 6,684,230 B1 | * | 1/2004 | Momoh et al. | 707/205 |
| 6,728,716 B1 | * | 4/2004 | Bhattacharya et al. | 707/10 |
| 6,836,775 B2 | * | 12/2004 | Anderson et al. | 707/10 |
| 2002/0083120 A1 | * | 6/2002 | Soltis | 709/200 |
| 2003/0088535 A1 | * | 5/2003 | Schaefer et al. | 707/1 |

OTHER PUBLICATIONS

"Architectural Considerations for next Generation File Systems"—Prashant Shenoy, Pawan Goyal & Harrick M. Vin—ACM Multimedia '99 Oct. 1999, Oriando, FL, USA (pps: 457–467).*

"Products" E–Mail, Inc. SMTP–X (www.emailinc.com/hp-products.htm—copyright 2002.*

* cited by examiner

Primary Examiner—Jean Corrielus
Assistant Examiner—Anh Ly
(74) Attorney, Agent, or Firm—Yee & Associates, P.C.

(57) ABSTRACT

A system provides referencing from one file system server to another through the use of a file system location database, improving movement and replication of file systems. When a file system is moved from a first file system server, a data object that references the file system remains in the first server and contains information used to find the current location of the file system. The actual location of the file system is stored in the separate file system location database, which contains the locations of file systems on a number of file system servers. This allows the data in a file system to be replicated or moved without requiring updates to the data in any redirecting or referencing servers.

15 Claims, 5 Drawing Sheets

METHOD, APPARATUS, AND PROGRAM FOR SEPARATE REPRESENTATIONS OF FILE SYSTEM LOCATIONS FROM REFERRING FILE SYSTEMS

RELATED APPLICATIONS

This application is related to commonly assigned and co-pending U.S. patent application Ser. No. 09/969,294 entitled "Apparatus and Method for Offloading Application Components to Edge Servers", filed on Sep. 28, 2001; U.S. patent application Ser. No. 09/960,451 entitled "Method and Apparatus for Minimizing Inconsistency Between Data Sources in a Web Content Distribution System", filed on Sep. 21, 2001; and U.S. patent application Ser. No. 09/960,448 entitled "Method and Apparatus for Caching Subscribed and Non-Subscribed Content in a Network Data Processing System", filed on Sep. 21, 2001, which are hereby incorporated by reference.

BACKGROUND OF THE INVENTION

1. Technical Field

The present invention relates to network file systems and, in particular, to supporting a uniform name space and transparent migration and replication of individual file systems. Still more particularly, the present invention provides a method, apparatus, and program for separate representations of file system locations from the data in referring file systems.

2. Description of Related Art

A network file system is a mechanism, an architecture, that allows a computer to use files on a separate machine as if they were local to the first machine. Network file systems include a high-level network protocol that provides the structure and language for file requests between clients and servers. The protocol provides the commands for opening, reading, writing and closing files across the network and may also provide access to directory services. In network file systems that support referrals, a client may ask a server for information about a name that appears in a first file system, as seen from the client, but is a reference to a second file system. As such, the response from the first file system must include information about the second file system, such as its location in the network. The client will then "mount" the second file system. Mounting simply means setting up the client's operating system to do input/output (I/O) operations on a file system.

FIGS. 1A–1C depict example network file systems.

Particularly, with reference to FIG. 1A, file system 106 includes a directory "usr." The "usr" directory includes a reference to file system "foo." The reference redirects a client to file system 116.

It is assumed that objects are arranged in a treelike structure, where files are arranged in directories and directories can contain other directories. Access to objects is achieved using path names, where a component of the path name designates the next sub-directory in the tree. The path starts at the top of the tree. A common convention uses forward slashes or back slashes to separate sub directories, and a single slash or backslash at the beginning of the path refers to the top of the hierarchy. For example, the path /a/b/C refers to an object "C" that is in directory "b." Directory "b" is in directory "a," which belongs at the top level of the hierarchy.

A file system may be moved from one location to another, such as to a new server. The referenced location must then redirect the client to the new location of the file system, and the source of the reference must be changed to indicate the new location of the file system as well. With reference to FIG. 1B, file system 106 includes a directory "usr." The "usr" directory includes a reference to file system "foo." The reference redirects a client to file system 116. However, "foo" has moved to file system 126. Therefore, file system 116 must include information to redirect the client to file system 126. At the same time, the information in file system 106 that had directed clients to file system 116 must be changed to direct them to file system 126.

A file system may also be replicated for increased reliability. Multiple file systems can thus reference a mounted file system. For example, in FIG. 1C, file system 106 includes a reference to file system "foo" in file system 116, file system 136 includes a reference to file system "foo" in file system 146, and file system 156 includes a reference to file system "foo" in file system 166. The file system "foo" moved to file system 126. Therefore, file systems 116, 146, 166 must be updated to include information to redirect the client to file system 126. However, too many updates results in inefficiency and a higher likelihood for error. For example, in FIG. 1C, file system 166 is not updated and the client is not redirected to the correct file system.

Similarly in FIG. 1C, the references to file system "foo" in file systems 106, 136, and 156 need to be updated so as to direct clients straight to file system 126 rather than any of 116, 146, or 166.

FIGS. 2A and 2B illustrate examples of file systems that allow mounting on remote machines. FIG. 2A depicts an example operation using Network File System (NFS), version 4 (NFSv4), which is an example of a network file system that allows mounting on remote machines. Client 208 requests an object "X" from file system (FS) server #1 206 (step 1). However, X is a mounted file system existing on FS server #2 216 and FS server #1 206 sends a redirection message identifying FS server #2 and the path, "/a/b/c/X," used to find X (step 2). Next, client 208 uses the information in the redirection message to access /a/b/c/X on server #2 (step 3).

NFSv4 requires that each referencing server include knowledge of the location and path for each mounted file system in the references returned to its clients. A server can send a redirection message that redirects the client to the server itself. This may be useful, for example, when a file system object is moved within a server. In addition, a chain of redirection messages may be used, for example, when an object is moved more than once. Thus, using NFSv4 or similar network file systems, particularly with multiple referencing servers, the likelihood for error exists.

As another example, FIG. 2B depicts an example operation of using the DCE's Distributed File System (DCE/DFS), which is another example of a network file system that allows referrals to remote machines. Using DCE/DFS, client 208 requests an object "X" from FS server #1 206 (step 1). However, X is a mounted file system existing on FS server #2 216 and FS server #1 206 sends an indirection response including file system identifier "Y" used to find the file system (step 2). Next, client 208 requests the location of "Y" from file system (FS) location database 220 (step 3). The FS location database returns the location of Y, "FS server #2," to client 208 (step 4). Thereafter, client 208 uses the location of FS server #2 to request the object from FS server #2 216 (step 5).

NFSv4 and similar network file systems require that a referring server know the correct locations where to direct clients. The obvious implementation of referrals in NFSv4 and similar network file systems is to embed the locations of the referenced file systems directly in the data stored in the referencing file system. The combination of the movability of the referenced file systems and the replicability of the referencing file systems makes this a cumbersome solution: if a referencing file system is replicated to many read-only locations and a referenced file system is subsequently moved, all the instances of the referencing file systems must be updated even though they are read-only. DCE/DFS avoids this complication by storing only an identifier for the target file system in the referencing file system, so that the client looks up the current location for the file system given the file system identifier from the referencing server. It would be much less cumbersome for the client, not to mention conformant with NFSv4 and similar network file systems, if the server could handle the changing of file system locations without explicit updating of all references.

SUMMARY OF THE INVENTION

The present invention provides a file system that allows referencing between file systems which interacts well with motion and replication of file systems. A first file system includes a data object that references a second file system. The data object acts as a place holder for the second file system, but does not contain changeable data such as the name of the server containing system. The data object can be a new or existing file type with data identifying the second file system or some of its properties. The data required to locate the second file system, such as the name of a file server, is stored in a file system location data structure that is located outside the first file system. The data object then contains a key value, such as a name or a number, identifying the second file system, that can be used to look up the file system location. This allows the data in the second file system to be replicated or moved without requiring updates to the data in any redirecting or referencing servers.

The present invention also uses a basic notification mechanism to enable clients to access a uniform name space that can include all file system objects available on participating file servers. When a referencing server sends a redirection message to a client, the redirection typically includes a server location and a path. In the present invention, the referencing server encodes the file system identification and includes the encoded file system identification rather than the path. When a server receives a request with a path that is encoded, the server decodes the file system identification. Then, the server may locate the root of the file system identified by the file system identification and return the root object to the client. Location of the root can be done either by accessing the file system location data structure or by using another data structure.

To guarantee that clients will enter the name space at the same point, and thus view the same name space regardless of the initial participating server contacted, the present invention includes a special referral object, called the root referral object, and a special root file system. The root referral object is the top level object in all participating file servers. It contains a referral to a special designated file system identification, which is the special root file system. Whenever a client contacts a participating server and asks for the root object, the server will send a redirection message to the client containing the file system identification of the root file system. Since all participating file systems contain the same root file system identification, all clients will view the same name space regardless of which file server is initially contacted.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
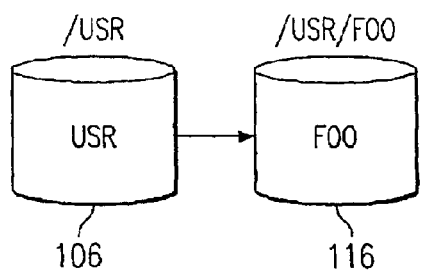
FIGS. 1A–1C depict example network file systems.
Figure 1B:
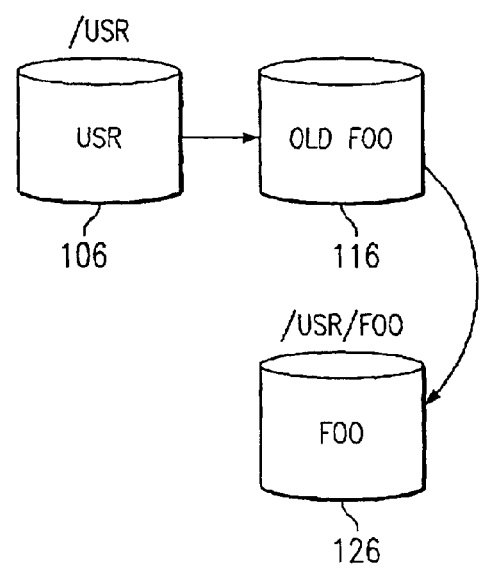
Figure 1C:
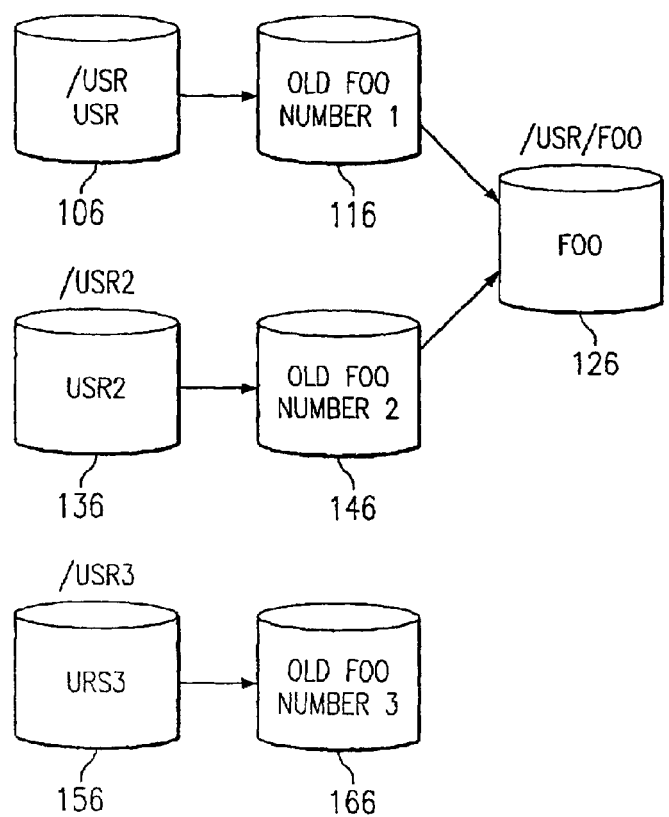
Figure 2A:
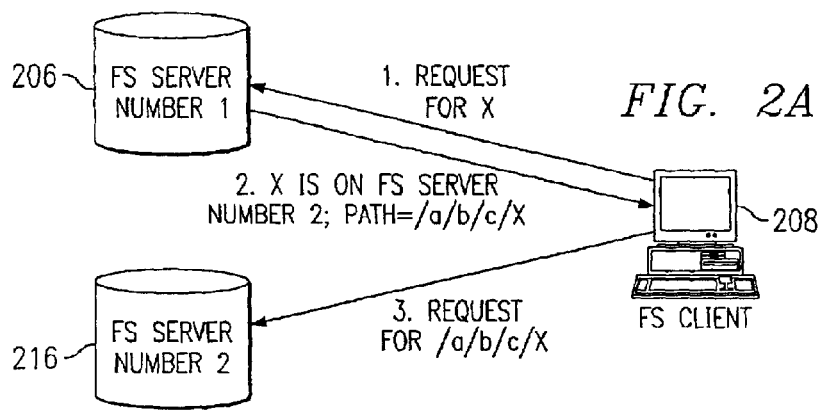
FIGS. 2A and 2B illustrate examples of file systems that allow mounting on remote machines.
Figure 2B:
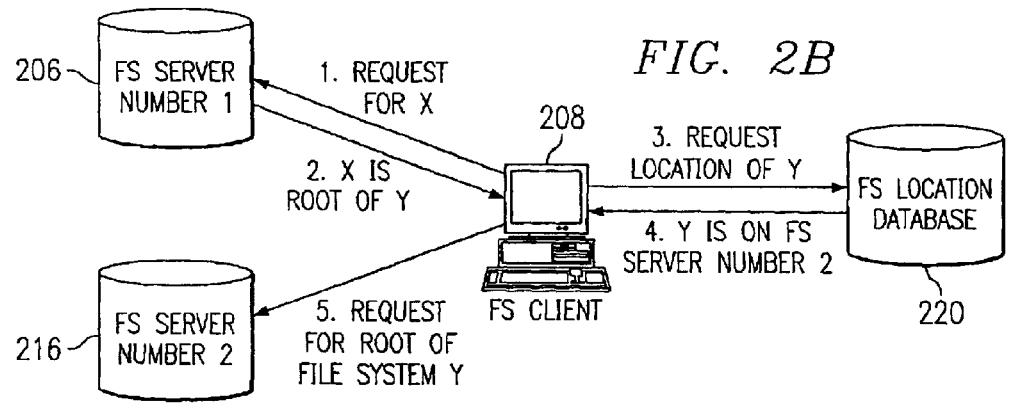
Figure 3:
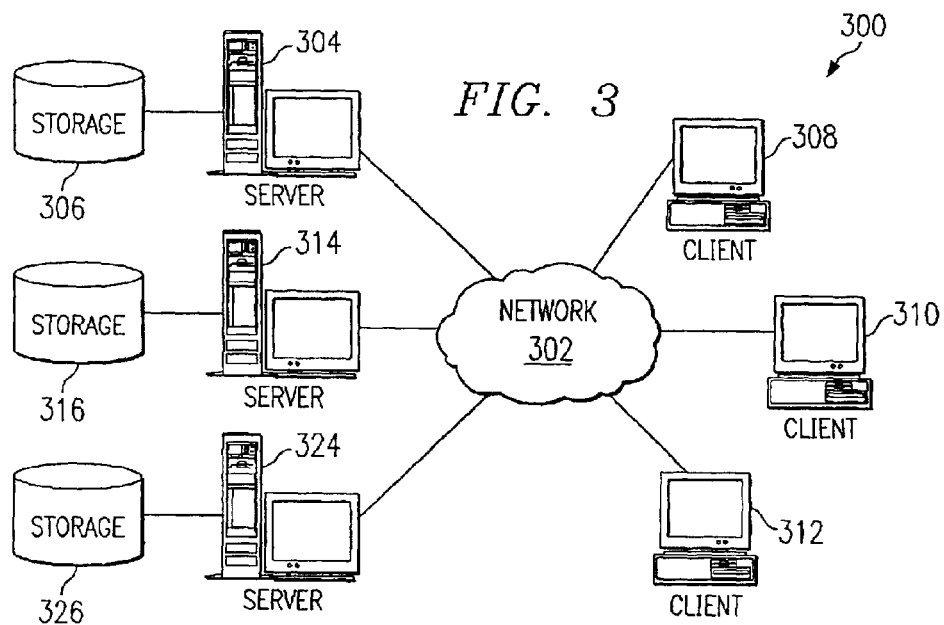
FIG. 3 depicts a pictorial representation of a network of data processing systems in which the present invention may be implemented.

With reference again to the figures, FIG. 3 depicts a pictorial representation of a network of data processing systems in which the present invention may be implemented, Network data processing system 300 is a network of computers in which the present invention may be implemented. Network data processing system 300 contains a network 302, which is the medium used to provide communications links between various devices and computers connected together within network data processing system 300. Network 302 may include connections, such as wire, wireless communication links, or fiber optic cables.

In the depicted example, servers 304, 314, 324 are connected to network 302. Servers 304, 314, 324 serve requests for storage units 306, 316, 326, respectively. In addition, clients 308, 310, 312 are connected to network 302. These clients 308, 310, 312 may be, for example, personal computers or network computers. In the depicted example, servers 304, 314, 316 provides data stored in storage units 306, 316, 326 to clients 308–312. Clients 308, 310, 312 are clients to server 304, for example. Network data processing system 300 may include additional servers, clients, and other devices not shown.

In the depicted example, network data processing system 300 is the Internet with network 302 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 300 also may be implemented as a number of different types of networks, such as for example, an intranet, a local area network (LAN), or a wide area network (WAN). FIG. 3 is intended as an example, and not as an architectural limitation for the present invention.

Figure 4:
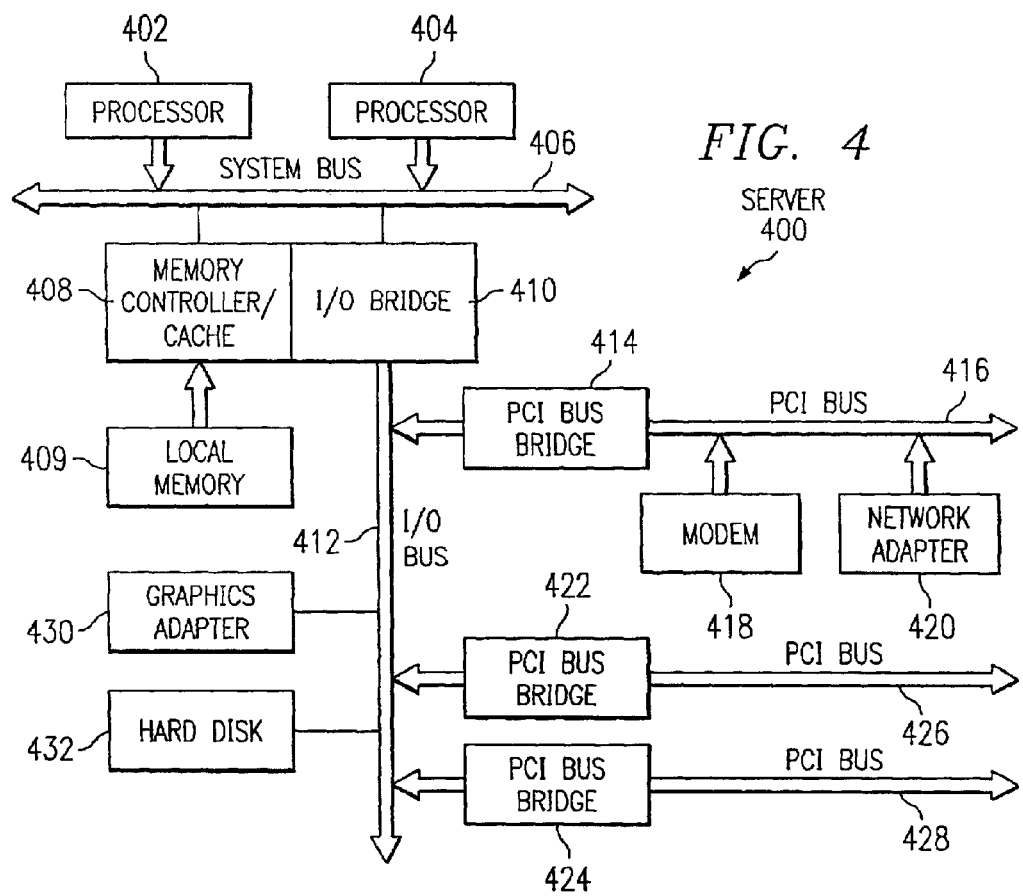
FIG. 4 is a block diagram of a data processing system that may be implemented as a server in accordance with a preferred embodiment of the present invention.

Referring to FIG. 4, a block diagram of a data processing system that may be implemented as a server, such as one of servers 304, 314, 324 in FIG. 3, is depicted in accordance with a preferred embodiment of the present invention. Data processing system 400 may be a symmetric multiprocessor (SMP) system including a plurality of processors 402 and 404 connected to system bus 406. Alternatively, a single processor system may be employed. Also connected to system bus 406 is memory controller/cache 408, which provides an interface to local memory 409. I/O bus bridge 410 is connected to system bus 406 and provides an interface to I/O bus 412. Memory controller/cache 408 and I/O bus bridge 410 may be integrated as depicted.

Peripheral component interconnect (PCI) bus bridge 414 connected to I/O bus 412 provides an interface to PCI local bus 416. A number of modems may be connected to PCI local bus 416. Typical PCI bus implementations will support four PCI expansion slots or add-in connectors. Communications links to network computers 308–312 in FIG. 3 may be provided through modem 418 and network adapter 420 connected to PCI local bus 416 through add-in boards.

Additional PCI bus bridges 422 and 424 provide interfaces for additional PCI local buses 426 and 428, from which additional modems or network adapters may be supported. In this manner, data processing system 400 allows connections to multiple network computers. A memory-mapped graphics adapter 430 and hard disk 432 may also be connected to I/O bus 412 as depicted, either directly or indirectly.

Those of ordinary skill in the art will appreciate that the hardware depicted in FIG. 4 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 4 may be, for example, an IBM e-Server pSeries system, a product of International Business Machines Corporation in Armonk, N.Y., running the Advanced Interactive Executive (AIX) operating system or LINUX operating system.

Figure 5:
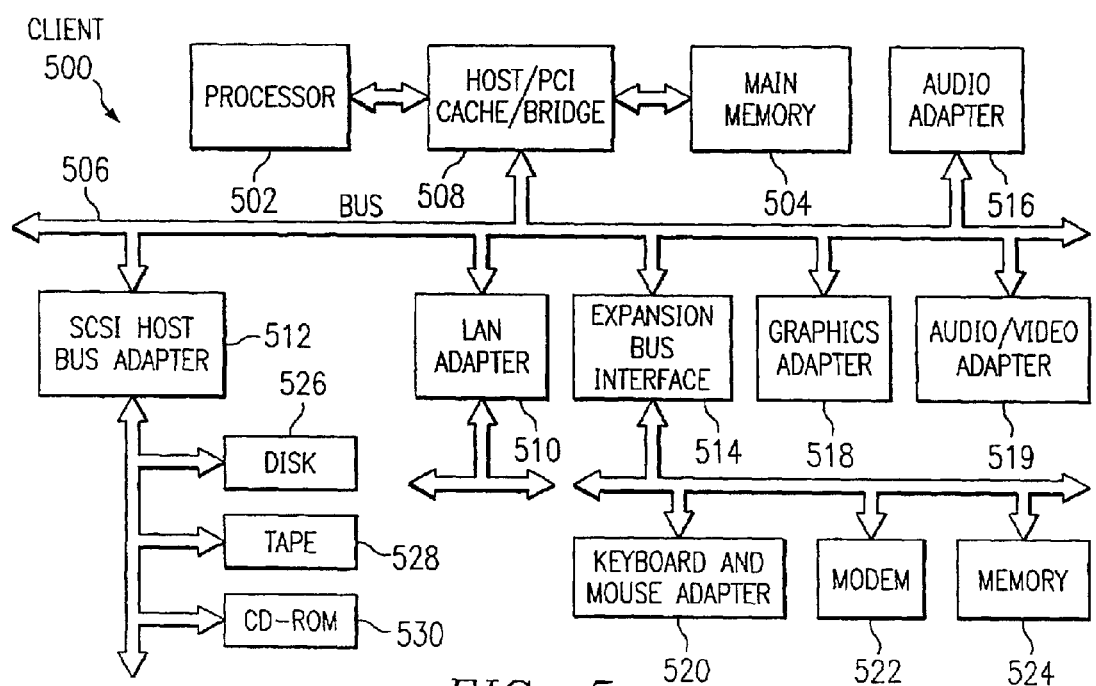
FIG. 5 is a block diagram illustrating a data processing system in which the present invention may be implemented.

With reference now to FIG. 5, a block diagram illustrating a data processing system is depicted in which the present invention may be implemented. Data processing system 500 is an example of a client computer. Data processing system 500 employs a peripheral component interconnect (PCI) local bus architecture. Although the depicted example employs a PCI bus, other bus architectures such as Accelerated Graphics Port (AGP) and Industry Standard Architecture (ISA) may be used. Processor 502 and main memory 504 are connected to PCI local bus 506 through PCI bridge 508. PCI bridge 508 also may include an integrated memory controller and cache memory for processor 502. Additional connections to PCI local bus 506 may be made through direct component interconnection or through add-in boards. In the depicted example, local area network (LAN) adapter 510, SCSI host bus adapter 512, and expansion bus interface 514 are connected to PCI local bus 506 by direct component connection. In contrast, audio adapter 516, graphics adapter 518, and audio/video adapter 519 are connected to PCI local bus 506 by add-in boards inserted into expansion slots. Expansion bus interface 514 provides a connection for a keyboard and mouse adapter 520, modem 522, and additional memory 524. Small computer system interface (SCSI) host bus adapter 512 provides a connection for hard disk drive 526, tape drive 528, and CD-ROM drive 530. Typical PCI local bus implementations will support three or four PCI expansion slots or add-in connectors.

An operating system runs on processor 502 and is used to coordinate and provide control of various components within data processing system 400 in FIG. 4. The operating system may be a commercially available operating system, such as Windows 2000, which is available from Microsoft Corporation. An object oriented programming system such as Java may run in conjunction with the operating system and provide calls to the operating system from Java programs or applications executing on data processing system 500. "Java" is a trademark of Sun Microsystems, Inc. Instructions for the operating system, the object-oriented operating system, and applications or programs are located on storage devices, such as hard disk drive 526, and may be loaded into main memory 504 for execution by processor 502.

Those of ordinary skill in the art will appreciate that the hardware in FIG. 5 may vary depending on the implementation. Other internal hardware or peripheral devices, such as flash ROM (or equivalent nonvolatile memory) or optical disk drives and the like, may be used in addition to or in place of the hardware depicted in FIG. 5. Also, the processes of the present invention may be applied to a multiprocessor data processing system.

As another example, data processing system 500 may be a stand-alone system configured to be bootable without relying on some type of network communication interface, whether or not data processing system 500 comprises some type of network communication interface. As a further example, data processing system 500 may be a Personal Digital Assistant (PDA) device, which is configured with ROM and/or flash ROM in order to provide non-volatile memory for storing operating system files and/or user-generated data.

The depicted example in FIG. 5 and above-described examples are not meant to imply architectural limitations. For example, data processing system 500 also may be a notebook computer or hand held computer in addition to taking the form of a PDA. Data processing system 500 also may be a kiosk or a Web appliance.

Returning to FIG. 3, server 304 provides access to storage 306. Similarly, server 314 provides access to storage 316 and server 324 provides access to storage 325. Storage 306 may store a first file system that includes a reference to a second file system stored in storage 316. In accordance with a preferred embodiment of the present invention, an reference object is placed in the first file system to serve as a place holder for the second file system. The reference object may be a new or existing file type with data indicating the second file system or some of its properties. This allows the normal directory enumeration procedures of the first file system to include a special name in a natural fashion.

With reference to FIGS. 6A–6D, example file systems are shown that allow mounting on remote machines in accordance with a preferred embodiment of the present invention. Particularly, with respect to FIG. 6A, an example is shown in which a referencing server requests location information for a referenced file system from a file system (FS) location database. Client 608 requests object "X" from FS server #1 606 (step 1). However, X is a mounted file system existing on FS server #2 616.

A referencing object may be a special file in a file system that contains an identification of a specific file system, also known as a file system identification (FSID). The FSID may be the key used to query the FS location database. The FS location database may contain, for each file system, the location of the server on which the file system resides. It may also contain the path name of the root of the file system on each server.

In the present invention, the purpose of the referencing object is to serve as a link to the root of another file system. From the client's perspective, the root of the file system that is referenced replaces the referencing object in the directory containing the referencing object. The mounted file system is thus accessed using the name of the referencing object. The client cannot itself access the referencing object using conventional file system operations. The access is manipulated by the referencing server.

FS server #1 606 sends a request for the location of x to FS location database 620 (step 2). It is convenient for the object that is in the file system on FS server #1 not to contain, itself, the information needed to the redirect the client. For example, a referencing object "X" on FS server #1 may contain a key value, such as a name or number, identifying the referenced file system.

FS server #1 606 may then use the key value to query FS location database 620 for the location of the file system.

FS location database 620 then returns the location of FS server #2 and the path "/a/b/c/X" to server 606 (step 3). Then, FS server 606 returns the location of FS server #2 and the path "/a/b/c/X" to client 608 (step 4). Client 608 then may send a request for "/a/b/c/X" to FS server #2 616 (step 5). FS server #2 may then access the file system and return the file system root to client 608. Alternatively, the location information may be found in some other data structure, such as a table in memory, rather than a database.

The key value associated with the file system may be static. Thus, the mounted file system may be moved, put off-line, replicated, copied, or cloned, and the referencing object need not be changed. Yet, the database or table in which the attributes for the referenced file system are maintained may be updated and changed, corresponding to the updates and changes of the referenced file system itself, without invalidating the data in the referencing file system.

In accordance with a preferred embodiment of the present invention, a basic notification mechanism is used to enable clients to access a uniform name space, which can include all file system objects available on all participating file servers. Thus, if a client uses a certain path name to reach a file system object using any of the file servers, any other client can use the same path name to reach the same object.

Figure 6A:
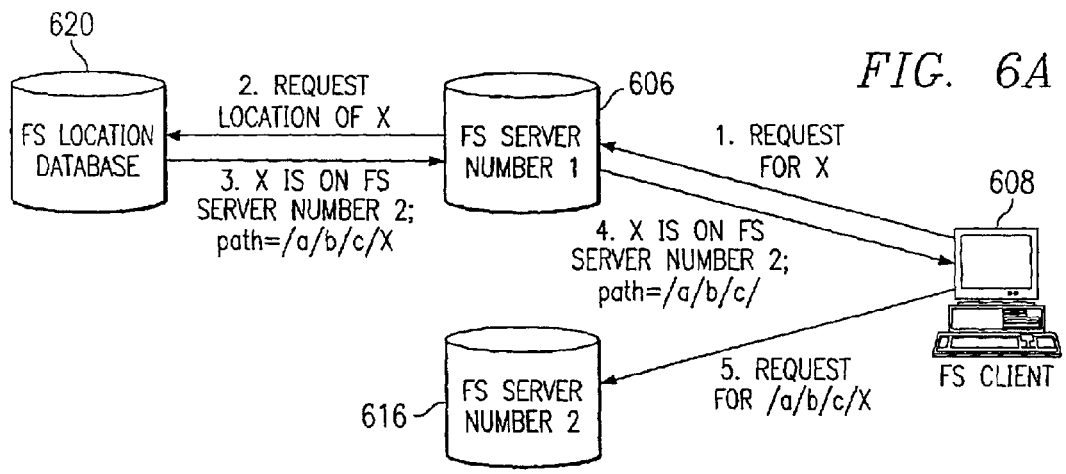
FIGS. 6A–6D illustrate example file systems that allow mounting on remote machines in accordance with a preferred embodiment of the present invention.
Figure 6B:
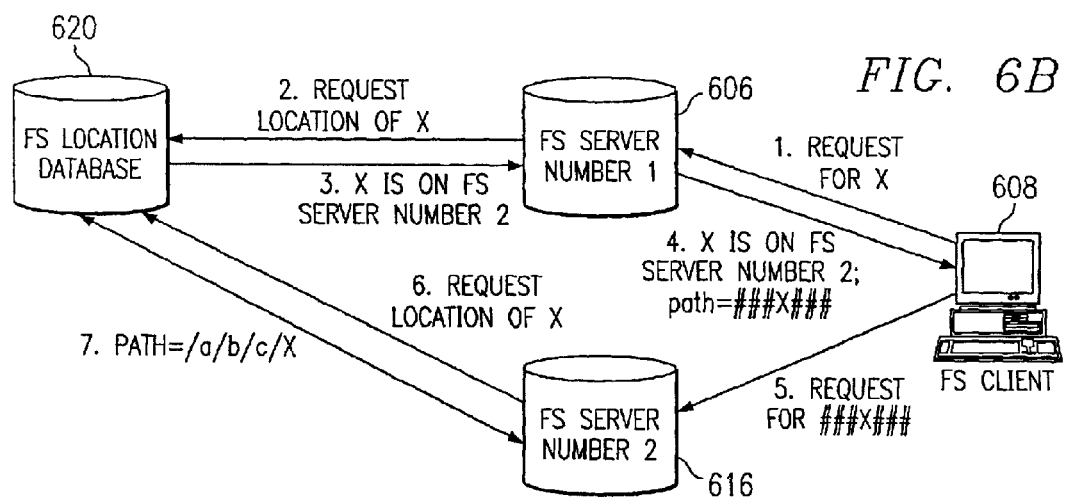

Turning to FIG. 6B, client 608 requests object "X" from FS server #1 606 (step 1). However, X is a mounted file system existing on FS server #2 616. FS server #1 606 sends a request for the location of X to FS location database 620 (step 2). FS location database 620 then returns the location of FS server #2 to server 606 (step 3).

In accordance with a preferred embodiment of the present invention, FS server #1 does not send a real path name to the client. Rather, FS server #1 606 encodes the FSID, in this case "X," using a predetermined, system wide encoding algorithm. The encoded FSID resembles a path name and can easily be decoded back to the FSID. For example, if the FSID is a text string, such as "user.bob," a simple encoding might be to add the string "###" at the beginning and at the end of the FSID, so the path would be "###user.bob###." As such, in the example shown in FIG. 6B, the encoded FSID would be "###X###." A requirement that disallows real path names from resembling encoded FSIDs must be enforced. A person of ordinary skill in the art will recognize that other encoding methods may also be used.

In FIG. 6B, FS server 606 returns the location of FS server #2 and the path "###X###" to client 608 (step 4). The encoded FSID is transparent to the client. The client, upon receiving the name of the new server and the encoded FSID, contacts the new server and retries to access the object by passing the new server the path name given by the old server, which is the encoded FSID. Thus, client 608 then sends a request for "###X###" to FS server #2 616 (step 5). FS server #2 recognizes the path name as an encoded FSID and requests the location of X from FS location database 620 (step 6). In return, FS location database 620 returns the path "/a/b/c/X" to FS server #2 616 (step 7). FS server #2 may then access the file system and return the file system root to client 608.

Figure 6C:
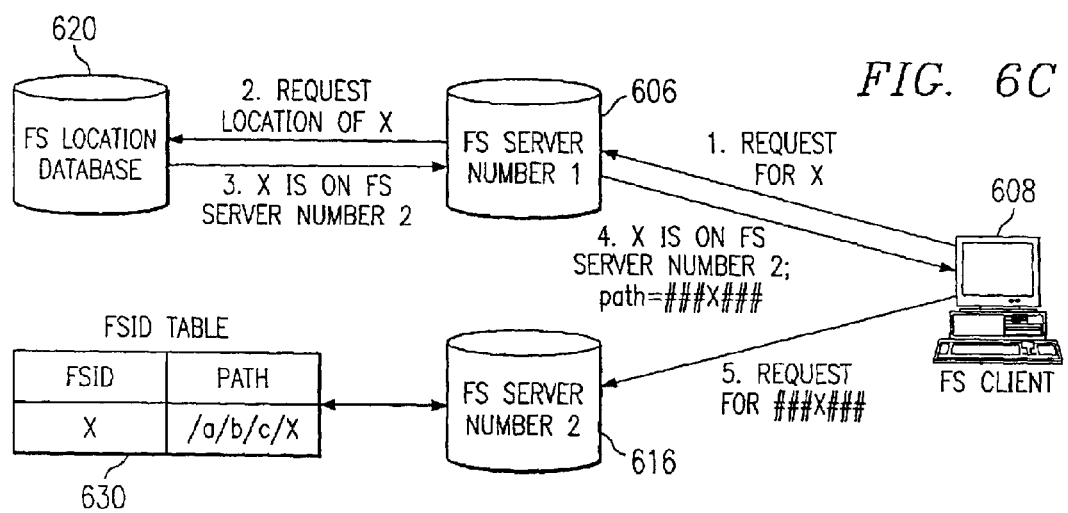

In an alternative and preferred embodiment, the location of the root of each file system can be stored in a local table that maps the FSID of each file system to a local path name. With reference to FIG. 6C, client 608 requests object "X" from FS server #1 606 (step 1). However, X is a mounted file system existing on FS server #2 616. FS server #1 606 sends a request for the location of X to FS location database 620 (step 2). FS location database 620 then returns the location of FS server #2 to server 606 (step 3).

FS server 606 returns the location of FS server #2 and the path "###X###" to client 608 (step 4). Client 608 then sends a request for "###X###" to FS server #2 (step 5). FS server #2 recognizes the path name as an encoded FSID and requests the location of X from FSID table 630 and returns the path "/a/b/c/X" to FS server #2 616. FS server #2 may then access the file system and return the file system root to client 608.

Alternatively, a file system may be mounted in a special directory using a special mount point. The mount point may be a string representation of the FSID. In the example of FIG. 6C, the file system identified by "X" could be mounted in the "/exports/X." Therefore, FS server #2 616 need not look the FSID up in a table or database, because the file system is mounted in a predetermined directory which serves as an appropriate table.

To guarantee that clients will enter the name space at the same point, and thus view the same name space regardless of the initial participating server contacted, the present invention includes a special referencing object, called a root referencing object, and a special root file system. The root referencing object is the top level object in all participating file servers. It contains a reference to a special designated FSID, which is the identifier for the special designated root file system.

Figure 6D:
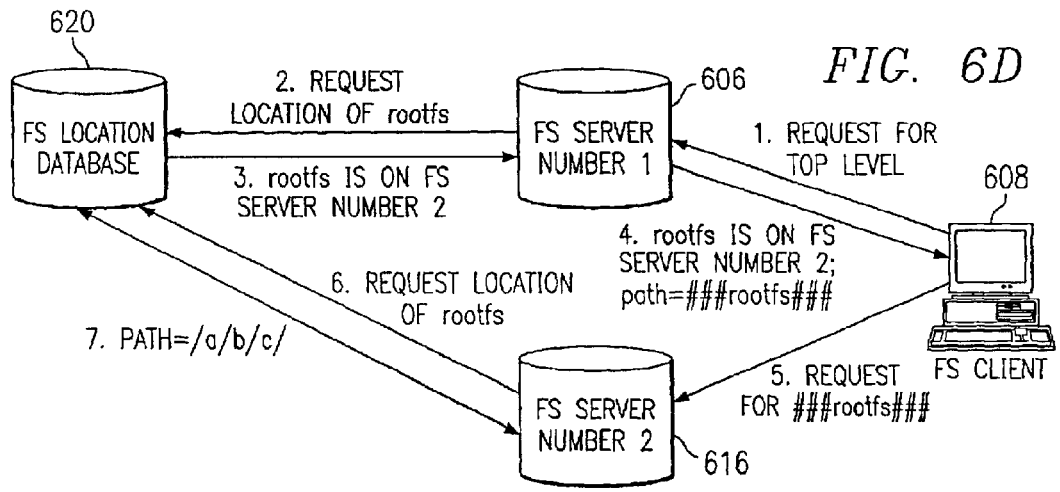

As an example, the FSID referred to by the root referencing object may be "rootfs." Whenever a client contacts a server and requests the root object, the server will access the root referencing object. Turning now to FIG. 6D, client 608 requests the top level object from FS server #1 606 (step 1). FS server #1 606 accesses the root referencing object and sends a request to FS location database 620 for the location of the file system with the FSID of "rootfs" (step 2). The FS location database returns the location of rootfs, FS server #2, to FS server #1 606 (step 3). FS server #1 then encodes the FSID to form "###rootfs###" and sends a redirection message indicating that the file system is on FS server #2 and the path is "###rootfs###" to client 608 (step 4).

Next, client 608 sends a request for "###rootfs###" to FS server #2 616 (step 5). FS server #2 recognizes the path name as an encoded FSID and sends a request for the location of the rootfs file system to FS location database 620 (step 6). The FS location database then returns the path, "/a/b/c/," to FS server #2 616 (step 7). FS server #2 may then access the file system and return the file system root to client 608. In an alternative and preferred embodiment, the location of the root of the file system can be stored in a local table that maps the FSID of each file system to a local path name.

The example in FIG. 6D shows only two file system servers. However, fewer or more participating servers may be included. For example, the network file system may include only a single server, such as server 616. If a client requests the top level object of FS server #2 616, the server may send a redirection message redirecting the client to itself with the encoded FSID, "###rootfs###." The example of FIG. 6D may also include more participating file system servers, each of which has the same referencing object as its top level object.

Figure 7:
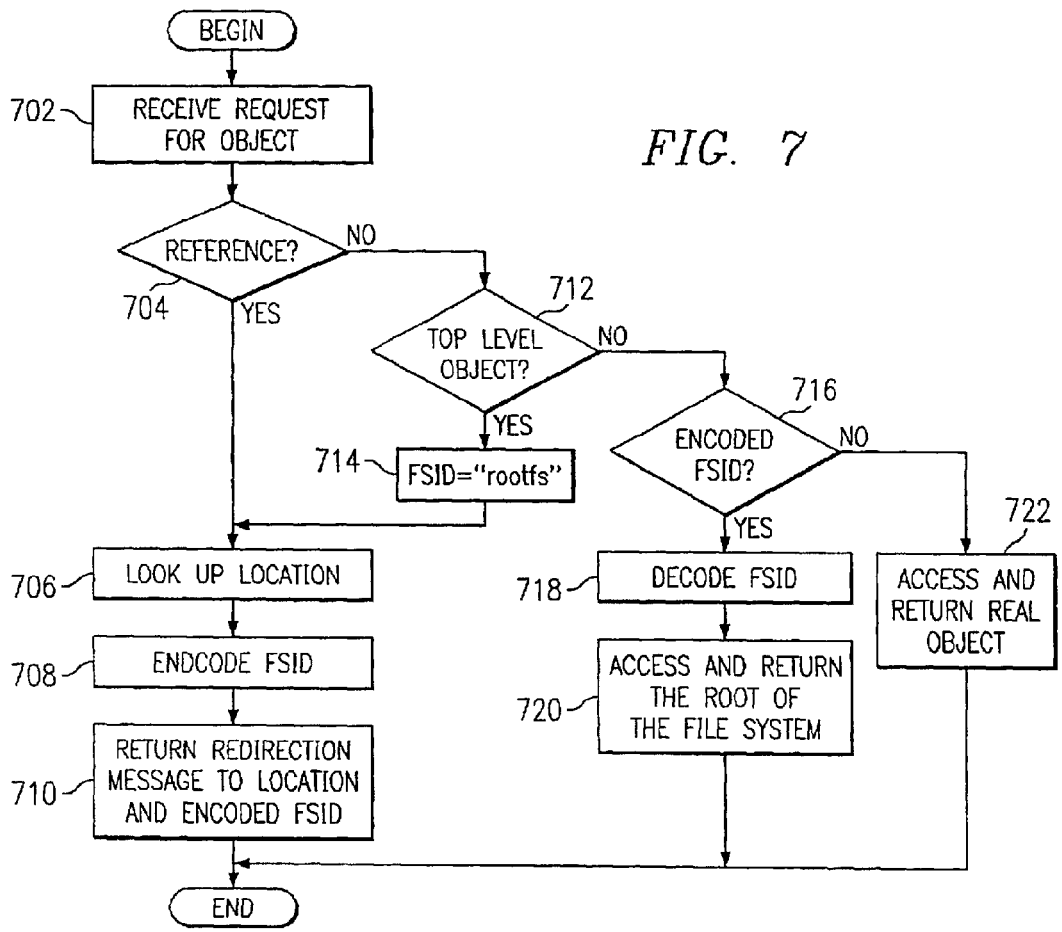
FIG. 7 is a flowchart illustrating the operation of a file system server in accordance with a preferred embodiment of the present invention.

With reference to FIG. 7, a flowchart is shown illustrating the operation of a file system server in accordance with a preferred embodiment of the present invention. The process begins and receives a request for an object (step 702). A determination is made as to whether the object is a reference to another file system (step 704). If the object is a reference to a separate file system, the process looks up the location of the separate file system (step 706) and encodes the FSID of the file system (step 708). Next, the process returns a redirection message indicating the location and the encoded FSID as the path name to the client (step 710) and ends.

If the object is not a referencing object in step 704, a determination is made as to whether the object is a top level object (step 712). If the object is a top level object, the process accesses the root referencing object indicating an FSID of "rootfs" (step 714). Then, the process looks up the location of the file system (step 706) and encodes the FSID of the file system (step 708). Thereafter, the process returns a redirection message indicating the location and the encoded FSID as the path name to the client (step 710) and ends.

If the object is not a top level object in step 712, a determination is made as to whether the path is an encoded FSID (step 716). If the path is an encoded FSID, the process decodes the path to form the FSID (step 718), accesses and returns the root of the file system (step 720), and ends. If the path is not an encoded FSID in step 716, the process accesses and returns the real object (step 722) and ends.

A referencing object may refer to a file system on an unmodified server that does not incorporate the present invention. This may be achieved by having the referencing object itself include the location of the unmodified server and the path name of the file system on that server. When a client accesses the referencing object, the server will reply with the information included in the FS location database for the file system on the unmodified server.

The referencing object may also include an FSID, as if it referred to a modified server. However, the file system database may contain a special tag that marks the file system stored on an unmodified server, together with the server location and path name. The server may then reply to the client with the information retrieved from the FS location database. However, the path name cannot comprise an encoded FSID, and the unmodified server may not be configured to contain referrals to other file systems.

The present invention may also support file systems that are replicated on various modified servers. If the network file system protocol supports a redirection message that includes more than one server, such as is the case with NFSv4, the present invention may be extended to include the locations of all the servers that host a particular file system. When a client attempts to access a referencing object, the modified server may reply with a list of file system server locations. The client may then select a server to access.

Alternatively, if the network file system protocol does not support a redirection message that includes more than one server location, the modified server, after receiving the list of server locations from the FS location database, may choose which server to include in the redirection message. The selection algorithm may be, for example, a round robin algorithm, and may be based on various factors, such as server load and server response time.

Thus, the present invention solves the disadvantages of the prior art by providing a data object that references a second file system that is interpreted directly by the file server. The data required to locate the second file system is stored in a file system location data structure that may be located outside the first file system. The data object may then contain a key value, such as a name or a number, identifying the second file system, that can be used to look up the file system location. Therefore, a file system may be referred to by another file system transparently to the client.

A referencing server encodes the file system identification and includes the encoded file system identification rather than a path. When a server receives a request with a path that is encoded, the server decodes the file system identification. Then, the server may locate the root of the file system identified by the file system identification and return the root object to the client. Location of the root can be done either by accessing the file system location database structure or by using another, local data structure. A root referral object is the top level object in all participating file servers. It contains a referral to a root file system identification, which is the root file system. Since all participating file servers contain the same root file system identification, all clients will view the same name space regardless of which file server is initially contacted.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a requested file system server, for servicing a request, comprising:

receiving a request for a referencing object from a client, wherein the referencing object refers to a referenced file system that has been moved to a location on a different server;

using information from said referencing object to look up a location of the referenced file system in a separate data structure;

returning a redirection message indicating the location of the referenced file system to the client, wherein the redirection message comprises an address of a referenced file system server containing the referenced file system and wherein the referencing object has a file system identifier;

encoding the file system identifier, wherein the redirection message further comprises the encoded file system identifier and wherein the referencing object is a top level object for a uniform namespace comprising all file systems on participating file system servers;

receiving a redirected request for a file system object;

identifying an encoded file system identifier in the redirected request;

decoding the encoded file system identifier to form a file system identifier corresponding to a requested file system;

looking up a path for the requested file system in a file system identifier data structure; and retrieving the root of the requested file system using the path for the requested file system.

2. The method of claim 1, wherein the redirection message further comprises a path.

3. The method of claim 1, wherein the referenced file system server is the requested file system server.

4. The method of claim 1, wherein the separate data structure comprises a file system location database.

5. The method of claim 1, wherein the file system identifier data structure comprises a file system identifier table.

6. The method of claim 1, wherein the separate data structure and the file system identifier data structure are stored in a file system location database.

7. The method of claim 1, wherein the referencing object is a top level object for a uniform namespace comprising all file systems on participating file system servers.

8. An apparatus, in a requested file system server, for servicing a request, comprising:

means for receiving a request for a referencing object from a client, wherein the referencing object refers to a referenced file system that has been moved to a location on a different server;

means for using information from said referencing object to look up a location of the referenced file system in a separate data structure;

means for returning a redirection message indicating the location of the referenced file system to the client, wherein the redirection message comprises an address of a referenced file system server containing the referenced file system and wherein the reference object comprises a file system identifier;

means for encoding the file system identifier, wherein the redirection message further comprises the encoded file system identifier and wherein the referencing object is a top level object for a uniform namespace comprising all file systems on participating file system servers;

means for receiving a redirected request for a file system object;

means for identifying an encoded file system identifier in the redirected request;

means for decoding the encoded file system identifier to form a file system identifier corresponding to a requested file system;

means for looking up a path for the requested file system in a file system identifier data structure; and means for retrieving the root of the requested file system using the path for the requested file system.

9. The apparatus of claim 8, wherein the redirection message further comprises a path.

10. The apparatus of claim 8, wherein the referenced file system server is the requested file system server.

11. The apparatus of claim 8, wherein the separate data structure comprises a file system location database.

12. The apparatus of claim 8, wherein the file system identifier data structure comprises a file system identifier table.

13. The apparatus of claim 8, wherein the separate data structure and the file system identifier data structure are stored in a file system location database.

14. The apparatus of claim 8, wherein the referencing object is a top level object for a uniform namespace comprising all file systems on participating file systems servers.

15. A computer program product, in a computer readable medium, for servicing a request comprising:

instructions for receiving, in a first file system server, a request for a referencing object from a client, wherein the referencing object refers to a referenced file system that has been moved to a location on a different server;

instructions for using information from said referencing object to look up a location of the referenced file system in a separate data structure; and instructions for returning a redirection message indicating the location of the referenced file system to the client, wherein the redirection message comprises an address of a referenced file system server containing the referenced file system and wherein the referencing object has a file system identifier;

instructions for encoding the file system identifier, wherein the redirection message further comprises the encoded file system identifier and wherein the referencing object is a top level object for a uniform namespace comprising all file systems on participating file system servers;

instructions for receiving a redirected request for a file system object;

instructions for identifying an encoded file system identifier in the redirected request instructions for decoding the encoded file system identifier to form a file system identifier corresponding to a requested file system;

instructions for looking up a path for the requested file system in a file system identifier data structure; and instructions for retrieving the root of the requested file system using the path for the requested file system.

* * * * *

UNITED STATES PATENT AND TRADEMARK OFFICE
CERTIFICATE OF CORRECTION

PATENT NO.     : 6,931,410 B2
DATED          : August 16, 2005
INVENTOR(S)    : Anderson et al.

It is certified that error appears in the above-identified patent and that said Letters Patent is hereby corrected as shown below:

Column 11,
Line 28, before "the requested" delete "is" and insert -- comprises --.
Line 52, after "wherein the" delete "reference" and insert -- referencing --.

Column 12,
Line 13, before "the requested" delete "is" and insert -- comprises --.
Line 49, after "request" insert -- ; --.

Signed and Sealed this

Twenty-seventh Day of December, 2005

JON W. DUDAS
*Director of the United States Patent and Trademark Office*